PUNCHED CARD SENSING APPARATUS

April 21, 1959 D. J. DOMIZI 2,883,107

PUNCHED CARD SENSING APPARATUS

Filed Nov. 8, 1957 10 Sheets-Sheet 6

April 21, 1959 D. J. DOMIZI 2,883,107

PUNCHED CARD SENSING APPARATUS

Filed Nov. 8, 1957 10 Sheets-Sheet 7

April 21, 1959 D. J. DOMIZI 2,883,107

PUNCHED CARD SENSING APPARATUS

Filed Nov. 8, 1957 10 Sheets-Sheet 8

2,883,107

PUNCHED CARD SENSING APPARATUS

Dante J. Domizi, Parma, Ohio, assignor to Clary Corporation, San Gabriel, Calif., a corporation of California Application November 8, 1957, Serial No. 695,373
11 Claims. (Cl. 235—61.11)

This invention relates to perforated tag or card controlled apparatus and has particular reference to apparatus capable of reading information punched in coded form on a relatively small merchandise tag or card.

A principal object of the present invention is to simultaneously sense all of the data in a field of punched information in a tag or card.

Another object is to provide apparatus for sensing information punched in a combinational unit code and for translating the same into a single unit numerical system.

Another object is to provide a punched tag reading apparatus including a mechanical translating system for converting a combinational unit code into a single unit numerical system.

A further object is to provide a compact tag reading apparatus capable of sensing the positions of relatively closely spaced and small perforations in a merchandise tag or the like.

Another object is to reduce errors occasioned in a tag reader because of frayed perforation edges or chad which might adhere to the tag perforations.

Another object is to provide a relatively high speed perforated tag reader.

The manner in which the above and other objects of the invention are accomplished will be readily understood on reference to the following specification when read in conjunction with the accompanying drawings, wherein.

Figures 1, 2:
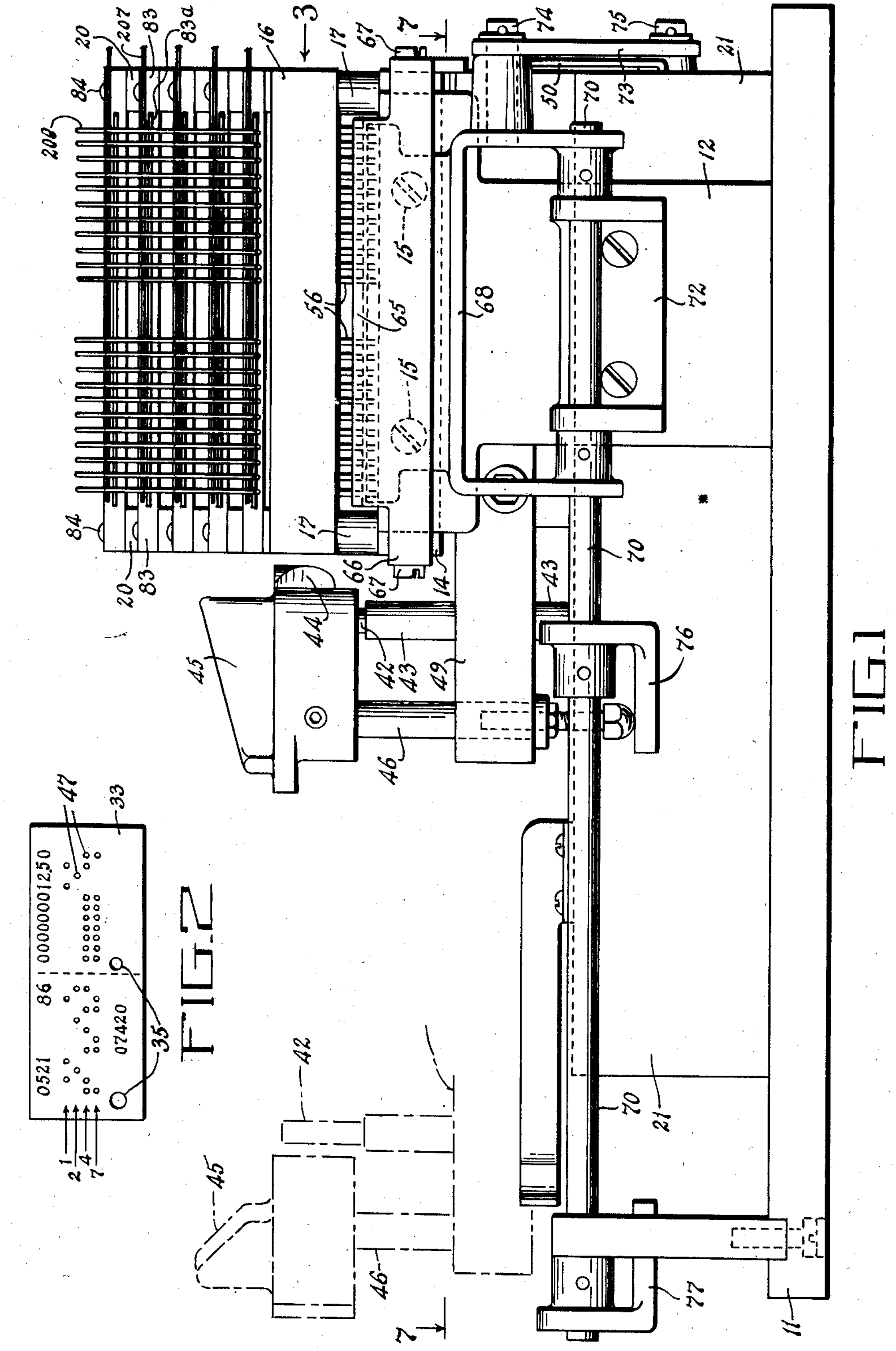
Fig. 1 is a side view of a tag reader embodying a preferred form of the present invention, showing the tag carriage in tag sensing location.
Fig. 2 is a plan view of a coded perforated tag which may be sensed by the tag reader.

In general, the tag reader, shown in Figs. 1 and 3 to 12, inclusive, is capable of sensing perforated tags of the type shown in Fig. 2 in which perforations are formed to represent in code various numerical information, such as the price and classification of an article of merchandise with which the tag is associated. The reader includes a mechanical translating device which translates the coded information into decimal form and closes corresponding switches which are located in circuits associated with the read-out machine whereby to control the latter to print such information and accumulate, if desired, any amounts listed thereon.

The tag illustrated is coded according to the "1, 2, 4, 7" combinational unit code in which perforations, either singly or in combinations of two, can be arranged to represent any decimal digit from "0" to "9."

*Tag reader*

Describing now the tag reader in detail, the latter is mounted on a base 11 (Fig. 3) to which are secured spaced upstanding side plates 12 and 13. A transfer pin guide block 14 is secured between the side plates by screws, i.e. 15.

A contact pin guide block 16 is mounted on spacers 17 above the plate 14 and is secured in position relative thereto by screws 18. The screws 18 are also effective to mount stepped contact support plates 20 in position on the block 16.

Upright tag carriage guiding plates 21 and 22 are suitably secured to the base 11 and are provided with inward facing grooves 23 to slideably support a bottom plate 24 of a tag carriage, generally indicated at 25. The latter comprises an inverted U-shaped block 26 suitably secured to the plate 24 and having spaced parallel extending tag retainer plates 27 and 28 secured on top thereof as by screws 30 (see also Fig. 7).

Figures 7, 16:
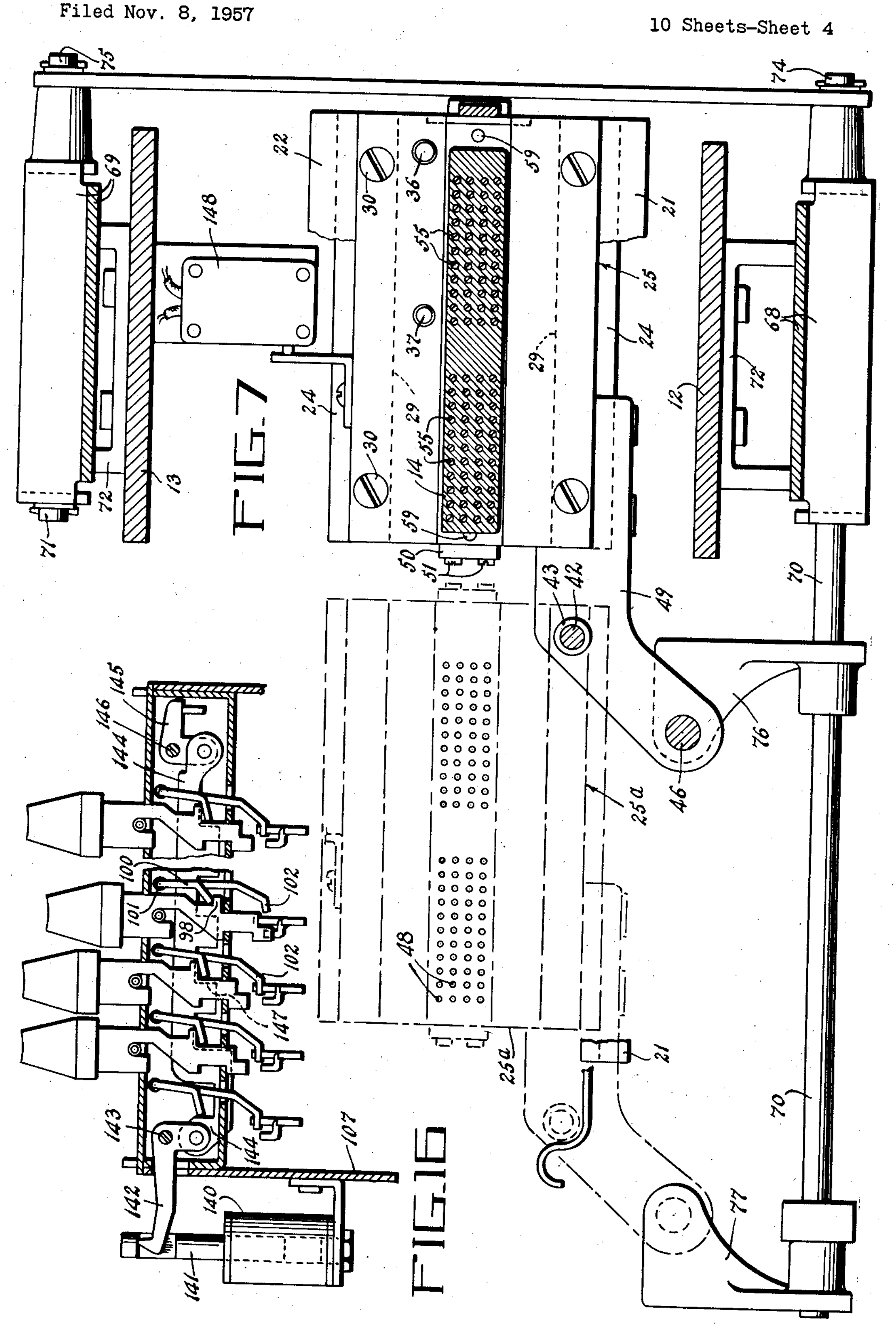
Fig. 7 is a sectional plan view of the tag reader and is taken substantially along the line 7—7 of Fig. 1.
Fig. 16 is a transverse sectional view illustrating the zero block control mechanism and is taken along the line 16—16 of Fig. 13.

The tag carriage 25 is movable from a tag sensing location within the tag reader, as shown in the full lines of Fig. 7, to a tag loading position outside of the reader as shown by the dot-dash lines 25a. In the latter position, a tag, i.e. 33, may be slid endwise into a groove 29 in the block located directly under the retainer plates 27 and 28.

The tag 33 is provided with spaced locater holes 35 (Fig. 2) which, when tag is properly placed in position, are arranged over locater pins 36 and 37 (Figs. 7, 9 and 10) guided for endwise movement in holes in the block 26 and in the plate 24. The latter pins are urged upwardly by compression springs 38 interposed between collars 40 on the pins and the plate 24. However, the lower ends of the locater pins are suitably secured to a cross head 41 which, in turn, is secured to a flattened side of a rigid L-shaped rod 42. A vertically extending portion of the latter rod is guided in a slide bushing 43 suitably mounted in a forward extending bracket 49 secured to the guide block 26. The upper end of the rod 42 terminates adjacent a cam surface 44 formed on a knob 45 attached upon the upper end of a yieldable rod 46 slideably and rotatably mounted in a bearing formed in the bracket 49.

Figures 9, 10, 11:
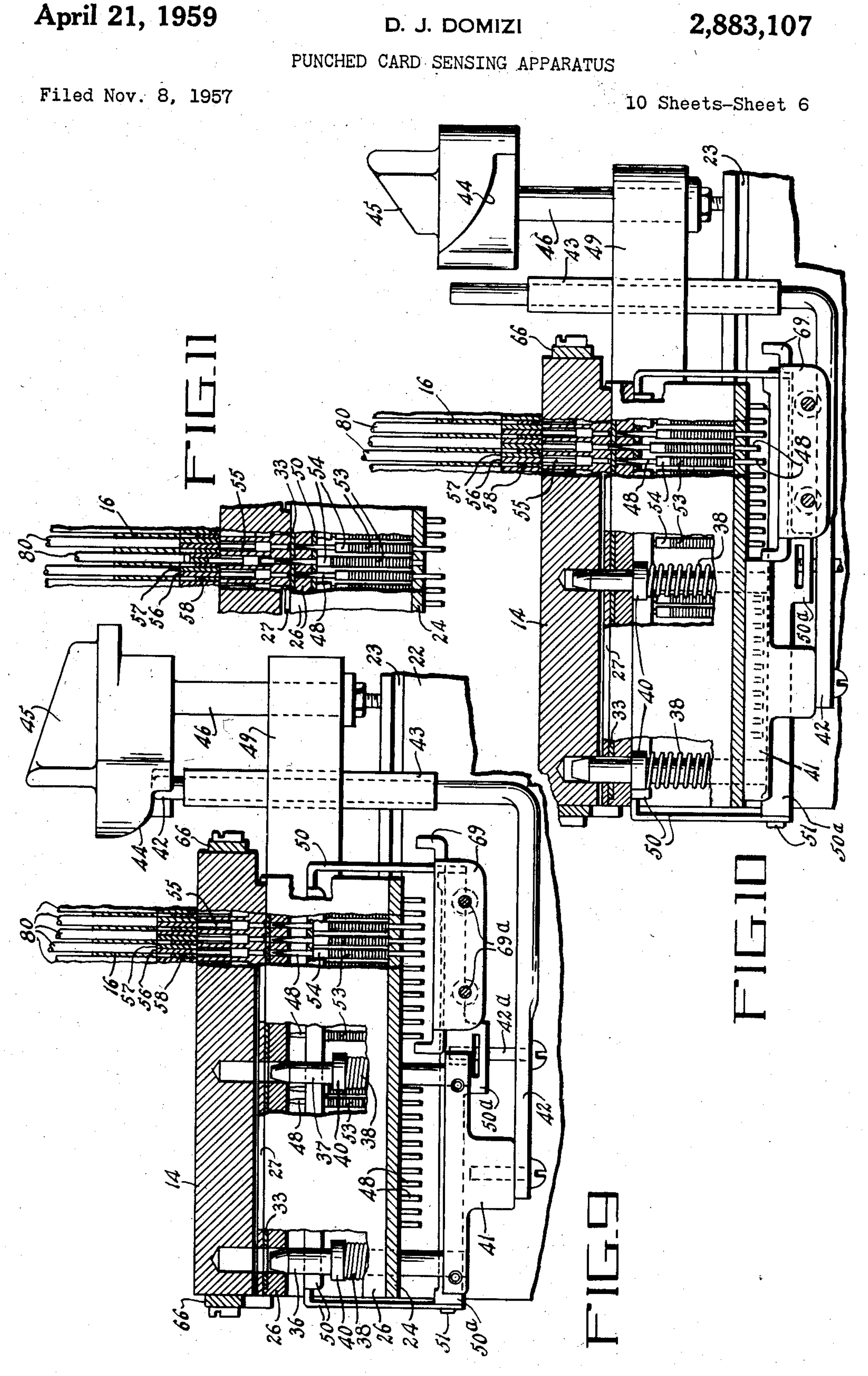
Fig. 9 is a sectional view taken substantially along the line 9—9 of Fig. 3 illustrating the tag carriage in tag sensing location in the reader unit, but with the sensing pin unit out of perforation sensing position.
Fig. 10 is a view similar to that of Fig. 9, but with the sensing pin unit in sensing position and before the translator slides are withdrawn.
Fig. 11 is a fragmentary view similar, in part, to Fig. 10, but illustrating the condition of the sensing and transfer pins after the slides have been retracted and then released to the position illustrated in Fig. 6.

When the knob 45 is rotated into its position shown in Fig. 9, its cam surface 44 holds the rod 42 and, accordingly, cross head 41 in a lowered position, maintaining the locater pins 36 and 37 out of engagement with the tag.

Figures 3, 4:
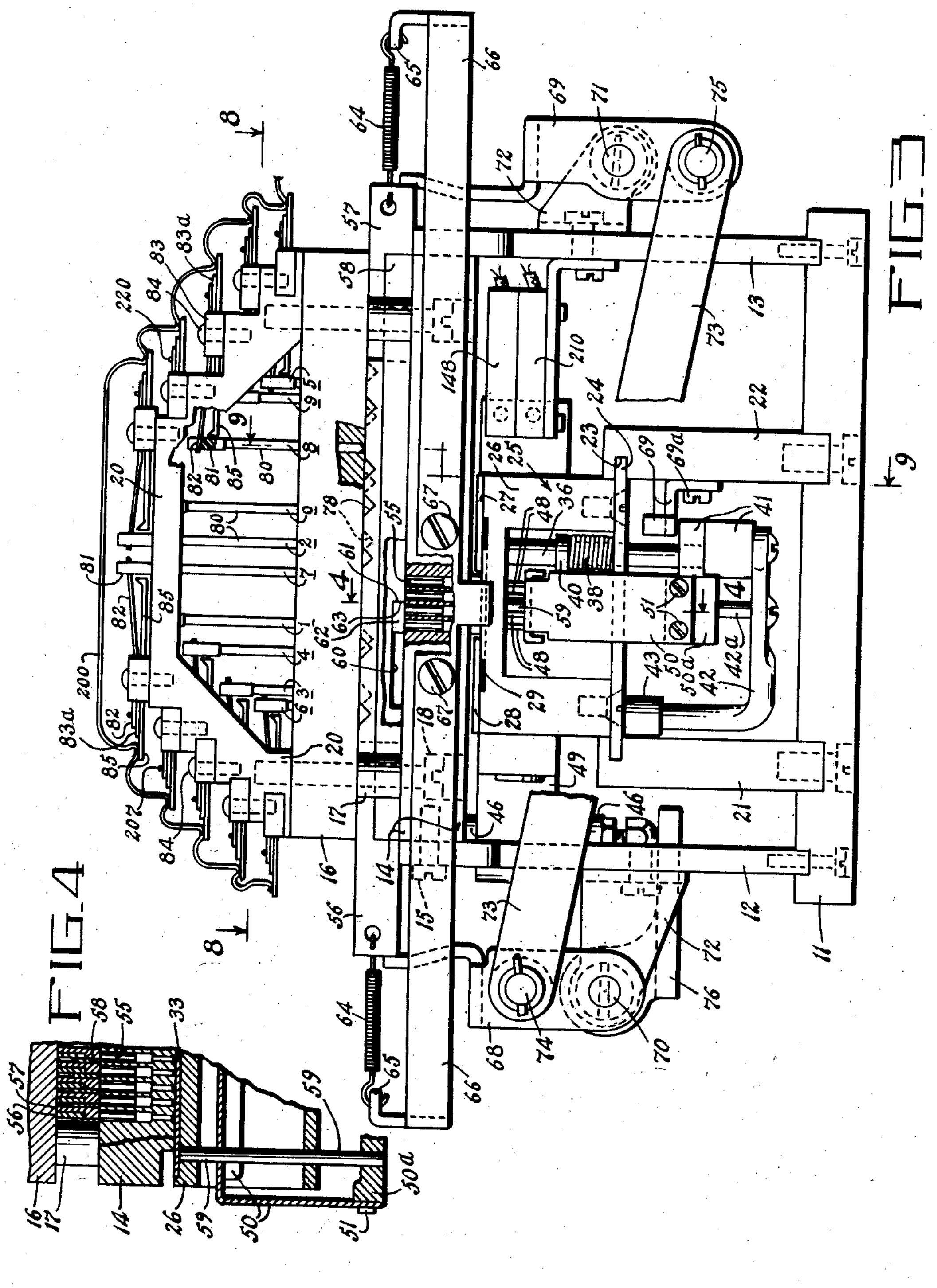
Fig. 3 is an end view of the reader, partly in section, and is taken in the direction of arrow 3 of Fig. 1.
Fig. 4 is a fragmentary sectional view through the tag carriage and a portion of the translating mechanism and is taken along the line 4—4 of Fig. 3.

When the tag is properly positioned in the groove 29 of the tag carriage and the tag carriage is properly located in its tag sensing location, code perforations, i.e. 47, therein are located directly over corresponding ones of a plurality of sensing pins 48. The latter taper upwardly and extend through holes in the block 26 and are guided in holes formed in the plate 24 and in an inverted U-shaped bracket 50 which is suitably secured as by screws 51 to the ends of a second cross head 50a. The bracket 50 and the cross head 50a are slideably guided as a unit for vertical movement upon a pair of rods 59 dependably secured at their upper ends in the block 26 (Figs. 4 and 7). The cross head 50a is yieldably attached to the rod 42 by a screw 42a.

The sensing pins 48 are urged upwardly by compression springs 53 extending between collars 54 on the sensing pins and the top of plate 24. However, when the rod 42 is held depressed by the knob 45, the bracket 50 (being located directly above the collars 54), is effective to hold the sensing pins depressed against the action of the springs 53, permitting the tag carriage to be slid at will into or out of the tag reader.

When the tag carriage is slid into the reader and the knob 45 thereafter returned to its position shown in Fig. 10 to release the rod 42, the various springs 38 and 53 will expand, raising the locater pins and sensing pins upwardly, as indicated in Fig. 10, wherein the sensing pins 48 will sense perforations in the tag. In those cases where the sensing pins pass through corresponding holes in the tag, they will engage the lower ends of aligned transfer pins 55 slideably mounted in holes formed in the block 16, and if the transfer pins are not blocked from movement, the sensing pins will raise the same into slide blocking positions.

In order to insure that the tag carriage is inserted fully into the reader before the sensing unit comprising the various sensing and locating pins can be raised into sensing position, and also to insure that the sensing unit is held in its lowered position during sliding movement of the pin carriage, a safety block 69 is secured as by screws 69a to the side of the side plate 22. The block is located adjacent the cross head 41 in a position to prevent the latter from being raised until the tag carriage is either fully inserted or fully withdrawn from the reader as will be apparent in Figs. 3, 9 and 10. The block also prevents the tag carriage from being withdrawn while the cross head is raised out of its lowered position.

Directly above the transfer pins 55, and cooperating with them, are a plurality of pairs of translating slides 56 and 57. The latter are edge guided between the block 14 and block 16 for endwise movement.

Each pair of translator slides is guided laterally by a barrier strip 58 which is suitably secured within a slot formed in the plate 14 whereby to hold each pair of translator slides in alignment with a respective row of the transfer pins.

Figures 5, 5A, 6:
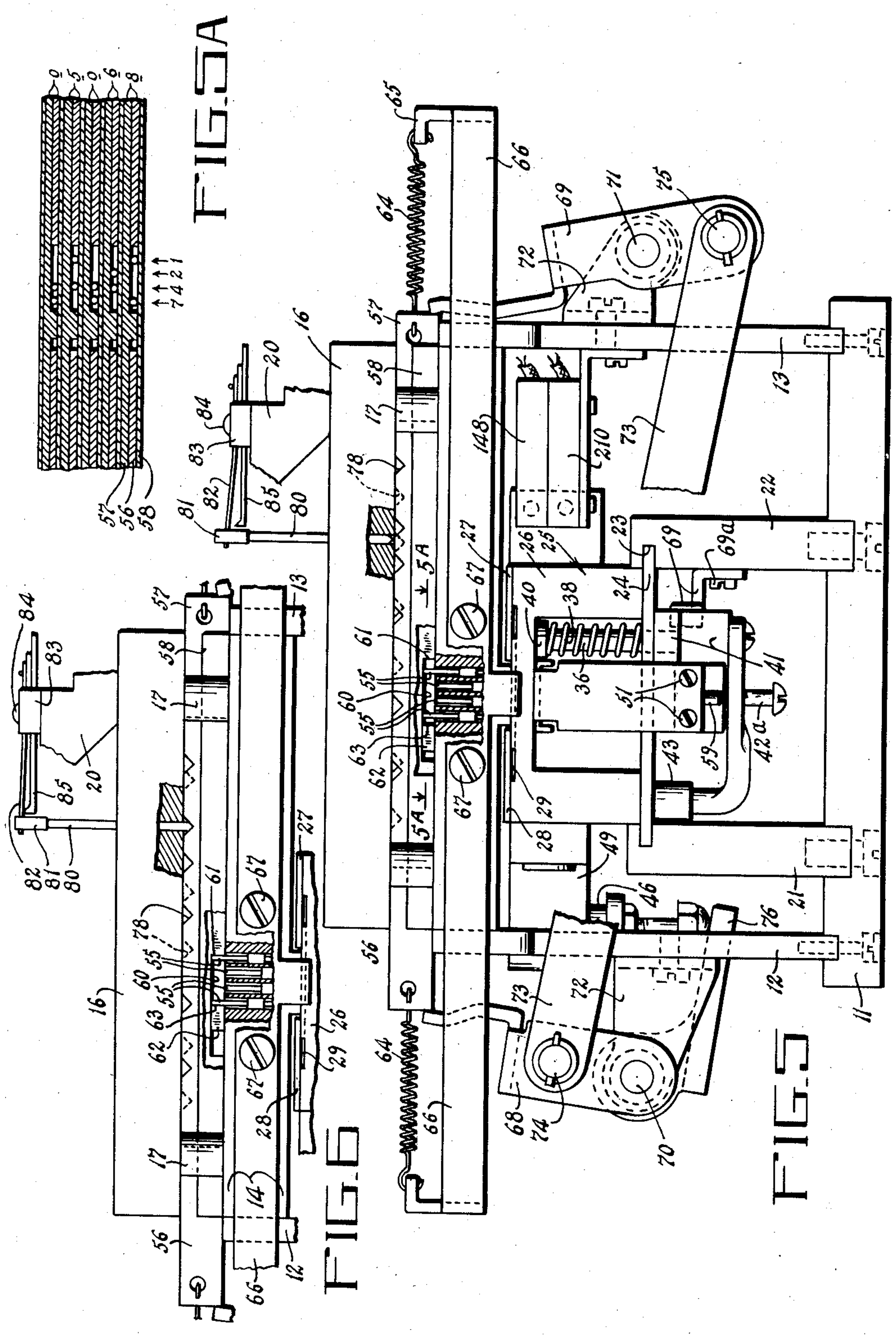
Fig. 5 is an end view similar to that of Fig. 3, but with parts broken away, illustrating the sensing pin unit in sensing position whereby certain transfer pins are elevated and with the translating slides retracted.
Fig. 5A is a sectional plan view through the translator slides and is taken along line 5A—5A of Fig. 5.
Fig. 6 is a view similar to that of Fig. 5 with further portions broken away and illustrating the translating slides released to differentially set positions.

Each of the slides 56 has a slot 60 formed in its lower edge, terminating in a limiting shoulder 61 which, when the slide is spring pressed to the left in Figs. 5, 5a and 6 will limit against the nearest raised transfer pin 55 in the associated row.

Each slide 57 has a laterally extending tongue 62 which slides in the slot 60 of the associated slide 56 and has a limiting shoulder 63 effective to engage the nearest raised transfer pin 55 when the slide is spring moved to the right.

Tension springs 64 are connected between the ends of the various slides and bracket pieces 65 formed on the opposite sides of a rectangular frame 66 which is attached by screws 67 to the plate 16. The springs 64 normally urge the slides 56 to the left and the slides 57 to the right whereby they are differentially limited by upwardly projected ones of the transfer pins 55.

Means are provided for simultaneously retracting all of the translator slides into their retracted positions shown in Fig. 5 to permit previously set transfer pins to drop their lower positions under the force of gravity and to permit other transfer pins to be raised into slide limiting positions by associated ones of the sensing pins. For this purpose, bails 68 and 69 are provided on opposite sides of the tag reader in position to engage the ends of all of the translator slides. The bails are fastened to pivot shafts 70 and 71, respectively, rotatably mounted in bearings formed in brackets 72 secured to the side plates 12 and 13. A link 73 is pivoted at 74 to bail 68, above shaft 70, and at 75 to the bail 69, below shaft 71, so as to enforce combined inward and outward movement of the bails.

As shown in Figs. 1 and 7, a pair of spaced arms 76 and 77 are suitably fastened to the pivot shaft 70. When the tag carriage is in its fully inserted or tag sensing location in the reader, the rod 46 on the knob 45 is located directly over the arm 76. Likewise, when the tag carriage is fully withdrawn from the tag reader, the knob 46 is located directly over the arm 77.

Figure 8:
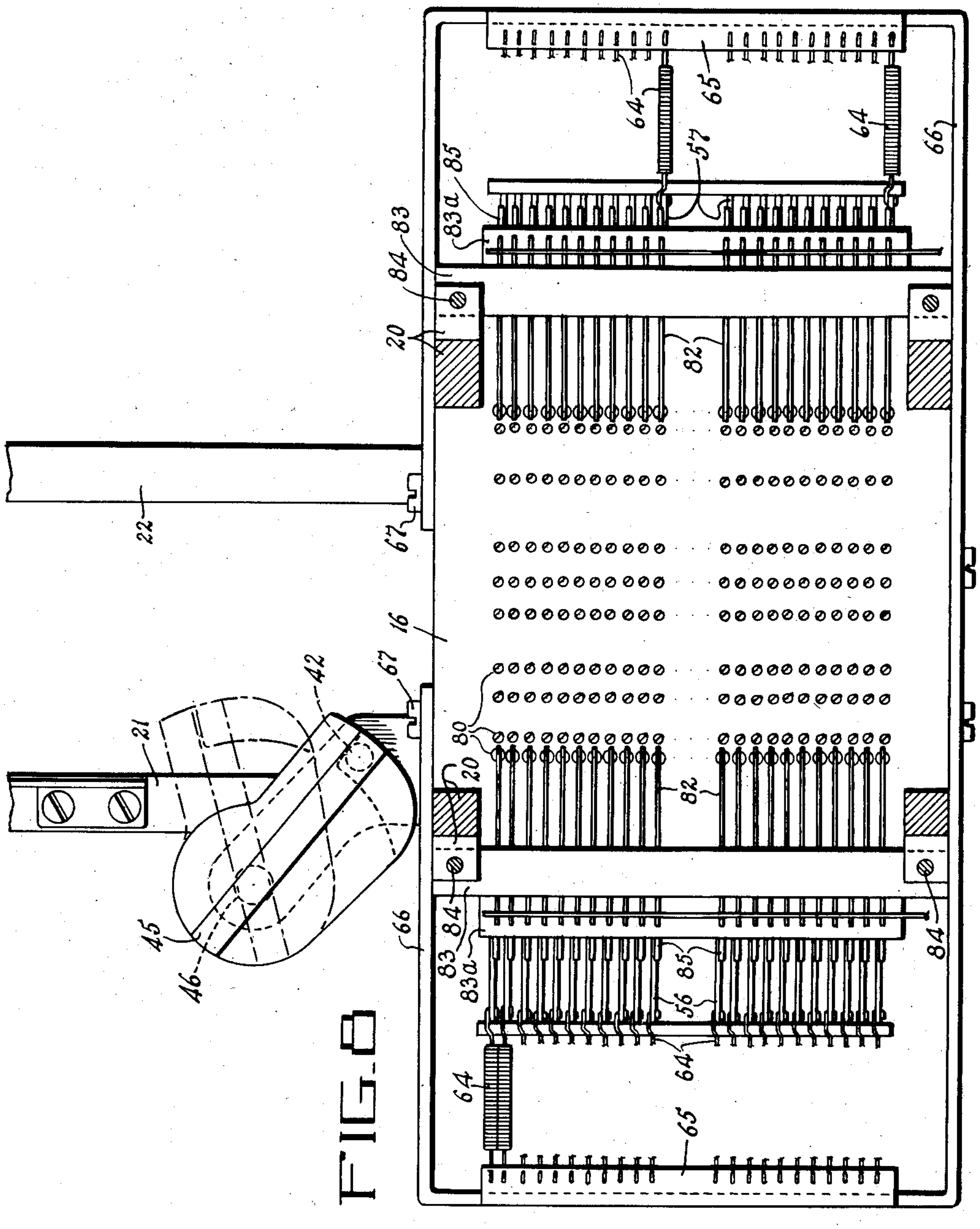
Fig. 8 is a sectional plan view taken along line 8—8 of Fig. 3.

When the knob 45 is rotated into its position shown in Fig. 10, i.e., into its position shown in dotted lines in Fig. 8, and then depressed, it will rock the arm 76 or 77 and thus cause bails 68 and 69 to retract all of the slides into their positions shown in Fig. 5.

Figure 12:
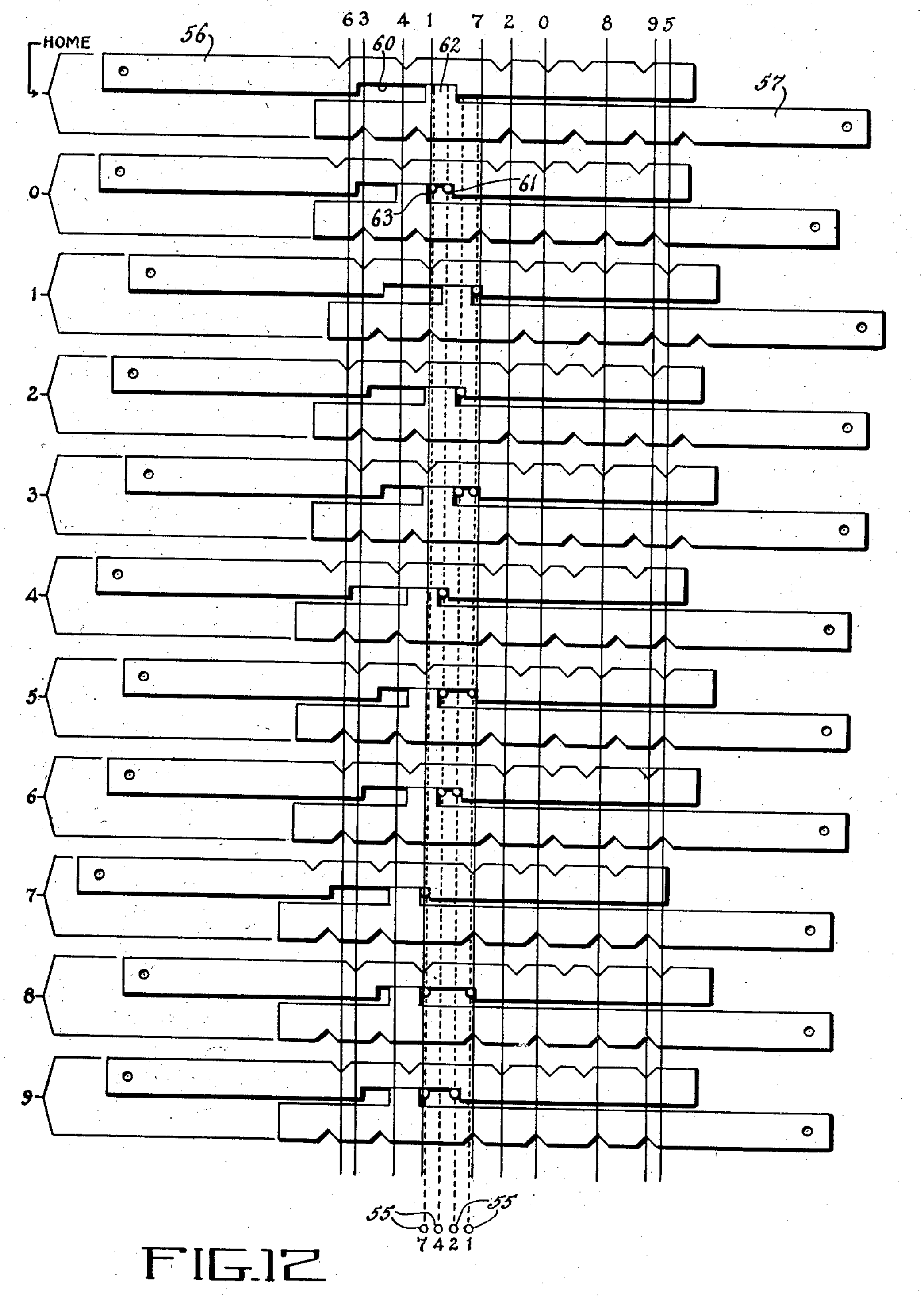
Fig. 12 is a schematic view illustrating the various relative positions of the translating slides when sensing different combinational settings of the transfer pins.

The upper edges of each pair of translator slides 56 and 57 have permutation notches 78 formed thereon in a particular pattern, as shown schematically in Fig. 12, depending upon a particular code selected. The pattern disclosed is intended for the well known "1," "2," "2," "4" combinational unit code. The notches are V-shaped and coact with a series of ten contact pins 80 slideably mounted in the block 16, each pin being arranged to ride on the edges of both of the associated slides.

Each contact pin 80 is provided with a cap 81 of insulating material which is slotted to receive a flexible wire contact blade 82 which is embedded in a cross piece 83 of insulating material fastened as by screws 84 to the stepped frames 20. Each blade 82 coacts at certain times with an associated rigid contact blade 85 likewise embedded in the associated cross piece 83. The blades 82 are further insulated from the blades 85 by strips 83a.

Normally, when no one or only one notch 78 in a pair of slides is located in registry with a contact pin 80 in the respective row, its associated contact blade 82 will be held out of engagement with its associated blade 85 as shown in Fig. 5.

The various contact pins 80 in each row represent various decimal digits ranging from "0" to "9" and when the translator slides are differentially set under control of one or two of the transfer pins, a particular pair of notches in both slides will register with each other and with one of the contact pins to cause the latter to drop thereinto, as shown in Fig. 6, so as to close its associated switch contacts.

*Operation of the tag reader*

In operation, in order to read a perforated tag, the tag carriage is withdrawn from the tag reader and the knob 45 is moved to its position shown in Fig. 9 to hold the sensing pin unit 50—50*a* and the locating pin unit 41 in their lowered position. A previously sensed tag may now be removed from the tag carriage 25 and a new tag to be read may be slid into place in the groove 29. The tag carriage is thereafter moved into tag sensing location in the tag reader. The knob 45 is then rotated into its position shown in Fig. 10 allowing the sensing and locating pins to move upwardly into sensing relation with the tag. At this time, however, the various translator slides 56 and 57 are held by their springs in engagement with previously set transfer pins, or if such pins were not previously set, the slides will be held by their springs in positions wherein the tongues 62 engage the limiting shoulders 61, thereby preventing any of the transfer pins from raising.

Accordingly, in order to set the transfer pins in accordance with the new tag to be read, the knob 45 is pressed downwardly to rock shafts 70 and 71, thereby actuating both bails 68 and 69 to retract all of the translator slides. The sensing pins 48 which have penetrated aligned perforations in the tag will now be enabled under the action of their respective springs to force the associated transfer pins 48 upwardly into the position assumed by the center sensing pin in Fig. 11. When pressure on the knob 45 is released, the translator slides will be advanced by their springs to a new combinational setting, and the contact pins 80 will be set accordingly.

*Read-out machine*

Figures 13, 14, 15:
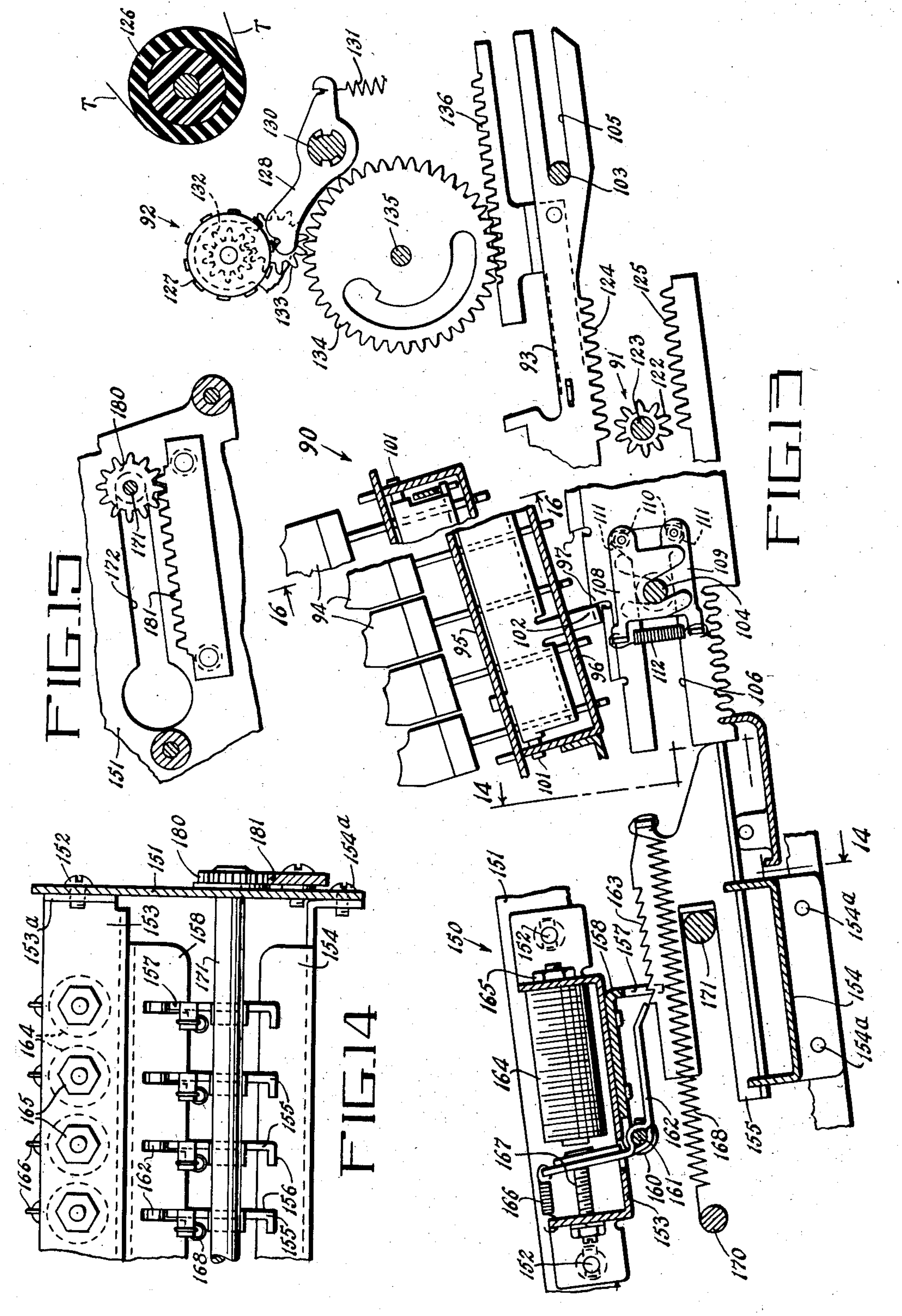
Fig. 13 is a longitudinal sectional view through a read-out machine for printing and/or accumulating values sensed by the tag reader.
Fig. 14 is a transverse sectional view of the rack stop unit of the read-out machine and is taken along the line 14—14 of Fig. 13.
Fig. 15 is a side view of the stop slide control shaft and means for causing parallel movement thereof and is taken along the line 15—15 of Fig. 21.

The tag reader controls a read-out machine generally indicated at 90 (Fig. 13) which is effective to print and/or accumulate in decimal form amounts read from a coded perforated tag by the tag reader.

The read-out machine is basically similar to the well-known commercially available Clary adding machine which is disclosed in the R. E. Boyden Patent No. 2,583,-810, issued on January 29, 1952. Details of the accumulator, generally indicated at 91, may be found in the E. P. Drake Patent No. 2,472,696, issued on June 7, 1949. Details of the printer mechanism, generally indicated at 92, and its entrainment with the actuator racks 93 may be found in the Busch et al. Patent No. 2,774,682, issued on May 8, 1956.

Since the basic structure of the machine is disclosed in the above noted patents, only those portions which are related to the present invention will be disclosed in detail. However, it is to be understood that the invention is not limited to the particular type of machine disclosed.

The read-out machine includes a plurality of the aforementioned racks 93 located in different denominational orders of the machine and each associated with a bank of nine amount keys 94 ranging in digital value from "1" to "9."

Each of the keys 94 is guided in aligned slots formed in a top frame plate 95 and a bottom frame plate 96. The bottoms of the key stems in each row cooperate with spaced shoulders 97 formed on the associated rack 93 whereby, when a key is depressed, it will limit the forward advance of its rack by an amount corresponding to the numerical value of such key.

Spring means (not shown) are provided to normally individually and yieldably maintain the various keys in their raised positions. Means are provided for locking any of the keys 94 in its depressed position, illustrated by the second key from the right in Fig. 16. For this purpose, each key stem has a cam projection 98 formed on one edge thereof and arranged so that when the key is depressed, it engages a locking bail 100 extending the length of the key row. The locking bails are pivoted at either end thereof, as shown at 101, to upstanding walls of the bottom key plate 96 and are urged clockwise, as seen in Fig. 16, by springs (not shown) against the various key stems. As a key is depressed, its cam lobe will rock the locking bail outwardly and as the projection 98 passes below the bail, the latter will retract partly to a position where it latches the key in its depressed position.

A zero block 102 extends downwardly from the locking bail and when no key in the row is depressed, the bail will locate the zero block directly in front of one of the shoulders 97 of the rack, thereby preventing forward movement of the latter. However, when any amount key in the row is depressed and latched down, the zero block will be held out of the path of the aligned rack.

Figures 17, 18, 19, 20, 21:
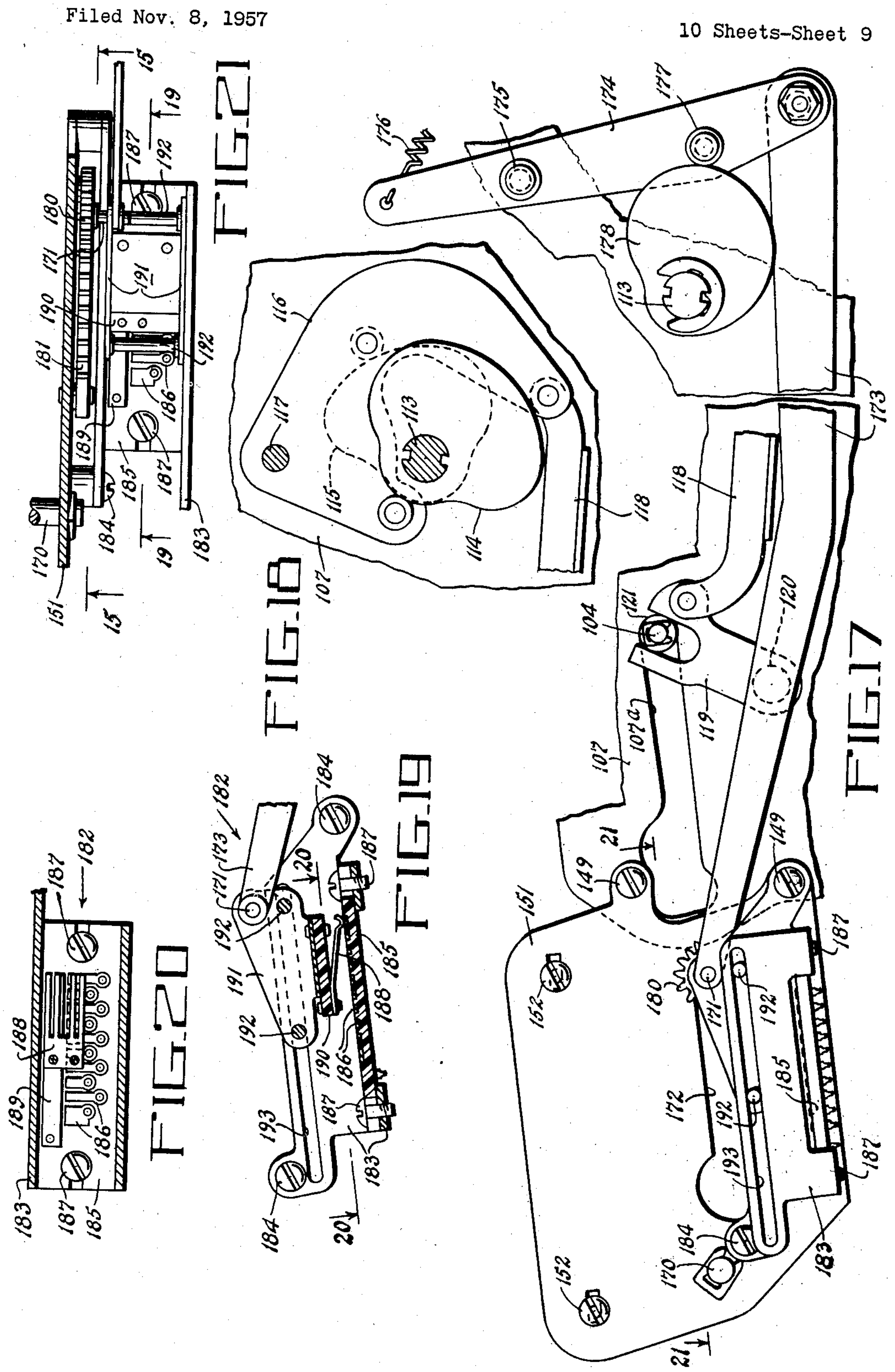
Fig. 17 is a side view illustrating the stop slide control shaft drive mechanism and part of the rack drive mechanism.
Fig. 18 is a side view illustrating the rack drive cams and cam followers.
Fig. 19 is a sectional view taken along the line 19—19 of Fig. 21, illustrating the scanning switch which is driven in time with the racks.
Fig. 20 is a sectional plan view taken along the line 20—20 of Fig. 19.
Fig. 21 is a sectional plan view of the scanning switch shown in Fig. 19, taken along line 21—21 of Fig. 17.

The various racks 93 are guided for fore and aft movement by shafts 103 and 104 embraced by guide slots 105 and 106, respectively, in each rack. The shaft 103 is stationary, but the shaft 104 is moved fore and aft of the machine, once during each cycle, and for this purpose is suitably guided in elongated guide slots, one of which is shown at 107*a* (Fig. 17), in the side frames 107 of the machine.

The shaft 104 is yieldably connected to each rack by a pair of opposed drive pawls 108 and 109. The latter carry rollers 110 which are normally held in depressions 111 formed in opposite edges of the rack slot 106 by a tension spring 112 extending between forwardly extending tails on the pawls. Whenever the rack is arrested, the rollers 110 will ride out of their associated depressions and along the edges of the slot 106.

The machine is driven by a rotatable drive shaft 113 (Figs. 17 and 18) operated by a motor driven cyclically operable clutch (not shown).

For the purpose of advancing the drive shaft 104 to actuate the various racks, a pair of complementary cams 114 and 115 are keyed on the shaft 113 and are engaged by rollers carried on a cam follower 116 which is fulcrumed at 117 and connected by a link 118 to a bifurcated arm 119. The arm is attached to one end of a rock shaft 120 which extends across the machine and is secured to a similar bifurcated arm on the opposite end. These arms, i.e. 119, embrace rollers, i.e. 121, rotatably mounted on opposite ends of the shaft 104 so as to cause parallel movement of this shaft during a machine cycle.

*Accumulator*

The accumulator 91 comprises a series of ordinally arranged gears 122 independently and rotatably mounted on an accumulator shaft 123. The accumulator is normally maintained in its neutral position illustrated in Fig. 13, but is raised or lowered, by means not shown, to mesh the accumulator gears with upper or lower rack gear sections 124 and 125, respectively, on the various racks, depending upon the type of operation to be performed. During normal adding or read-out operations and at the start of a machine cycle, the accumulator is raised to mesh the gears 122 with the rack gear sections 124, whereas during subtractive or totaling operations, the accumulator is lowered to mesh the racks with the rack gear sections 125. In either case, the accumulator is returned to its neutral position after advancement of the racks and before their return.

*Printer*

The various values represented by the numerical positions to which the racks 93 are advanced are printed on a paper tape T which is fed around a platen 126 to a printing station where a value represented by the positioning of the racks is printed.

The printer 92 comprises a series of numeral printing wheels 127, each operatively entrained with an associated one of the racks. Each printer wheel has spaced around its periphery a series of digit type ranging in value from "0" to "9." Each printer wheel is rotatably mounted on a separate printing arm 128 which is loosely keyed on a printer control shaft 130 and urged clockwise by a tensioned spring 131. A gear 132 integral with each printer wheel meshes with a gear 133 also rotatably mounted on the arm 128. Except during printing operations, the arms 128 are held by the shaft 130 in their illustrated positions wherein the gears 133 mesh with idlers 134 which are independently and rotatably mounted on a fixed support shaft 135.

The idler gears 134 are continuously meshed with offset rack sections 136 carried by the various racks 93.

After the various racks have been advanced to digitized positions and before their return, the printer control shaft 130 is rocked clockwise, by means not shown, permitting the springs 131 to carry those arms which would otherwise be allowed to do so to rock clockwise to effect printing. The shaft 130 is then returned to its original position to return the gears 133 into mesh with the idlers 134 before the racks are returned.

Suitable means (not shown) are provided for automatically preventing printing of those printing wheels which register zeros and which are located in denominational orders which are of a higher value than the order containing the highermost significant digit of the value to be printed.

*Read-out controls*

When operating the read-out machine under control of the tag reader, the various locking bails 100 are rocked outwardly away from the key stems to remove their zero blocks 102 out of blocking relation with the racks and to release any depressed keys. For this purpose, a solenoid 140 (Fig. 16) is mounted on one of the side frames 107 of the read-out machine and its armature 141 is connected to a bell crank 142 fulcrumed at 143 and having a pivotal connection to bail release bar 144. The latter is supported at its opposite end by a bell crank 145 fulcrumed at 146. The bar 144 is provided with shoulders 147 lying directly in front of projections on the various locking bails 100.

The solenoid 140 (see also Fig. 22) is connected in circuit with a normally open switch 148 (see also Figs. 3 and 7) which is closed by the tag carriage when the latter is moved into tag sensing location in the tag reader.

Means are provided for scanning the circuits associated with the various switch contact blades 82 (Figs. 3 and 22) on the tag reader in time with advancement of the racks and for arresting said racks when the latter have reached numerical positions corresponding to the values assigned to such contacts.

Referring in particular to Figs. 13, 14, 15 and 17, a rack arresting unit, generally indicated at 150, is provided. The latter comprises side frame plates, one of which is shown at 151, secured to the machine side frames, i.e. 107, by screws 149. A U-shaped cross brace 153 extends between the side plates 151 and is adjustably secured thereto by clamp screws 152 which extend through elongated slots in the side plates 151 and are threaded into wings 153*a* extending from the brace 153. A second U-shaped cross brace 154 extends between the side plates 151 and is suitably secured thereto as by screws 154*a*.

Denominationally arranged stop slides 155 are provided in the rack stop unit. Such slides are L-shaped in cross section and are guided in L-shaped guide slots 156 in the brace 154 at their lower edges and in guide slots 157 in a brace member 158 at their upper edges. The brace 158 is suitably secured to the under-surface of the brace 153 and is formed into bent over tongues 160 supporting a pivot rod 161. Stop pawls 162 are pivotally mounted on the rod 161 and each cooperates with a series of stop teeth 163 on its associated stop slide 155. The upper end of each pawl 162 forms the armature of an electromagnet 164, the core of which is attached by a threaded connection 165 to the rear flange of the cross brace 153. A tension spring 166 normally maintains each pawl 162 in its illustrated position against an adjustable stop screw 167 threaded in the forward flange of the cross brace 153.

The various stop slides 155 are urged forwardly by tension springs 168 extending between ears on the slides and a cross rod 170. Normally, however, the slides are held in their rearward illustrated positions wherein they abut the forward ends of respective ones of the racks 93 by a control shaft 171. The latter shaft extends across the machine and is guided at opposite ends thereof in elongated slots 172 formed in the side frame plates 151.

Means are provided for advancing the shaft 171 substantially in time with, but ahead of, the rack drive shaft 104 whereby to permit the stop slides 155 to follow until arrested by respective pawls 162. For this purpose, the shaft is connected by a link 173 to the lower end of a cam follower 174 which is fulcrumed at 175 and urged clockwise by a tensioned spring 176 to maintain a roller 177 thereon in engagement with a cam 178 keyed on the drive shaft 113.

In order to maintain parallel movement of the shaft 171 throughout its fore and aft travel, the latter has fastened at opposite ends thereof a gear, like gear 180 (Fig. 15), which meshes with a rack, like rack 181, suitably secured to the respective side frame plate 151.

A scan switch, generally indicated at 182 (Figs. 19, 20 and 21) is provided to successively scan the circuitry of the various switch contacts 82 of the tag reader and to control the electromagnets 164 accordingly. The scan switch comprises a U-shaped frame 183 attached by screws 184 to one of the side plates 151. The bottom of the frame 183 has an opening therein which is bridged by a plate 185 of insulating material having a series of equally spaced contacts 186 embedded thereon, the spacing of the contacts being the same as the pitch of the teeth 163 on the stop slide 155 and the teeth of the rack gear sections 124 and 125. The plate 185 is adjustably secured to the bottom of the frame 183 by clamp screws 187 which extend through elongated slots in the plate 185.

A conductor strip 189 is also embedded in the plate 185 alongside the various contacts 186, and the strip and contacts are adapted to be bridged by a scanning brush 188 attached to a plate 190 of insulating material which, in turn, is mounted on the bottom of a U-shaped carrier 191. Cross pins 192 fitted in the sides of the carrier 191 are guided in elongated slots 193 in the frame 183 to guide the brush 188 along the various contacts 186. The shaft 171 is fitted in a bearing in the carrier 191 and is thus effective to drive the brush 188 in time with the various stop slides.

Figure 22:
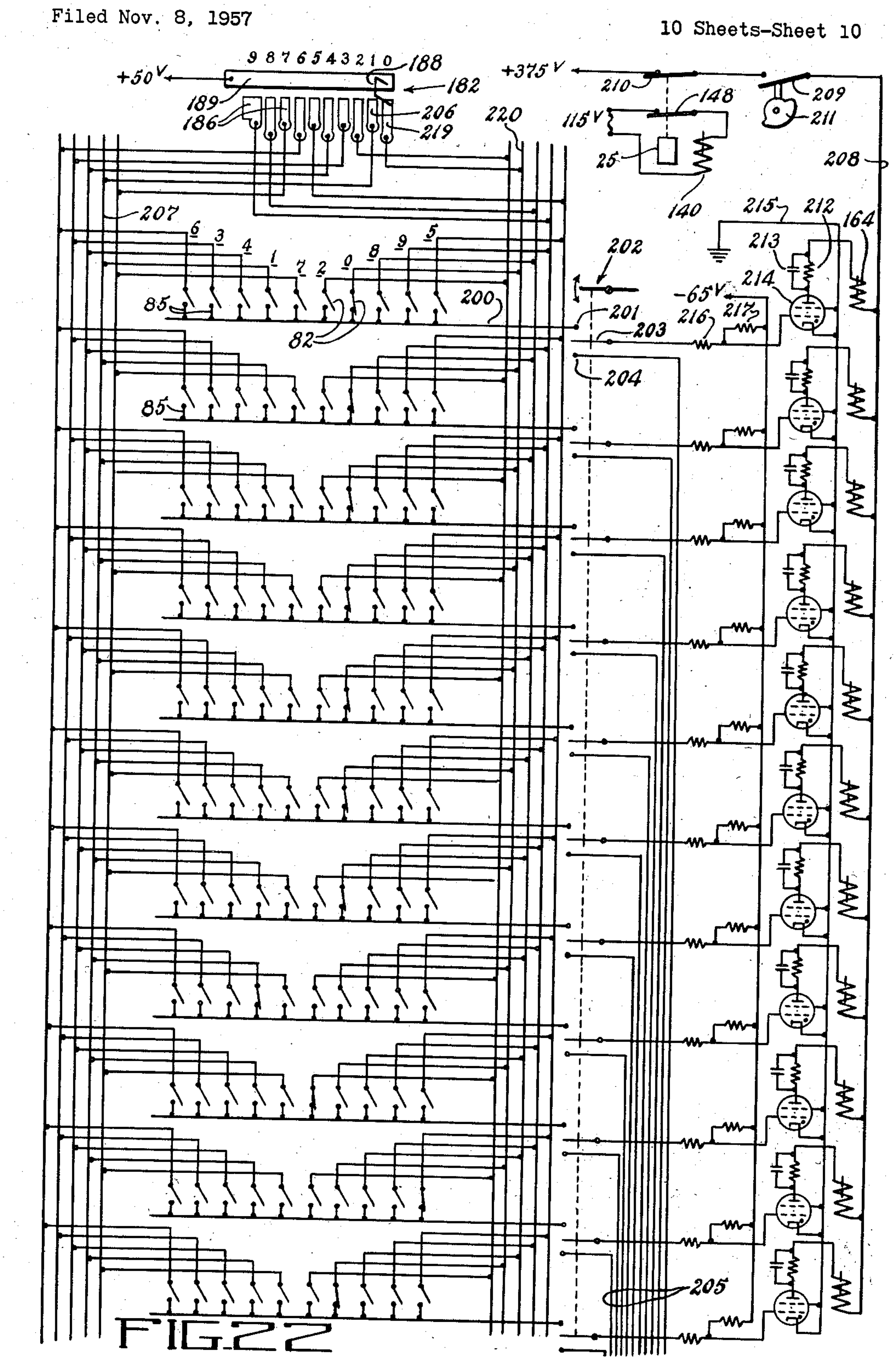
Fig. 22 is a diagram of the wiring for the tag reader and for the controls for the read-out machine.

Describing now the circuit for controlling the various denominationally arranged electromagnets 164, reference is had to Fig. 22. It will be seen that the various stationary contact blades 85 for each digital order are connected together by a common line 200 which, in turn, is connected to the upper terminal 201 of a double throw, multi-pole switch, generally indicated at 202. The latter is manually settable into either of two positions to connect each transfer blade, i.e. 203, with either the associated upper terminal 201, connected to a respective line 185, or with a lower terminal 204 connected to a respective one of a trunk of lines 205 which, in turn, are provided respectively with a plurality of contact blades (not shown) like blades 85. Also, like lines 200, another set of contact blades (not shown) like blades 82 are associated with lines 205 to complete the circuit through a line (like 207) to the scan switch 182.

It will be seen that various contact blades 85 for each column of contact pins 80 in the tag reader are connected together by a line, like line 200, which is connected to a terminal, like terminal 201, of a corresponding pole of the switch 202.

The movable contact blades 82 of all like identified contact pins 80 are all connected together and to a correspondingly identified contact 186 on the scanning switch. For example, the No. 1 scan switch contact 206 is connected by a line 207 to all No. 1 movable contacts 82 in the tag reader.

Each of the stop magnets 164 is connected through a common line 208 and series arranged switches 209 and 210 to a positive source of 375 volts. The switch 210 (see also Fig. 3) is normally open and is closed by the tag carriage 25 in the same manner as is switch 148 when the carriage is moved into tag sensing location. The switch 209 is controlled by a cam 211 keyed on the main shaft 113. The cam 211 is shaped to close the switch 209 at the start of a machine cycle and to open the same at an intermediate point after the racks have advanced to digitized positions and before their return.

The opposite side of each of the electromagnets 164 is connected through a parallel connected resistor 212 and capacitor 213 to the anode of a gaseous or thyratron type tube 214, such as commercially known as the Type 2D 21. The cathode of each tube is connected to a ground line 215. The control grid or igniter of each tube is connected through a resistor 216 to the transfer blade 203 of a respective pole of the switch 202. Normally, the igniters of the various tubes 214 are biased below the firing point and for this purpose each is connected through a bias resistor 217 to a source of minus 65 volt potential.

It should be noted, at this point, that the tag 33 (Fig. 2) has provisions for at least twenty-two columns of coded data. The tag reader is provided with a similar number of columns of sensing elements so as to concurrently sense all information recorded on the tag. However, the read-out machine is provided with a lesser number of columns, here represented as having only eleven orders. Accordingly, two cycles of the machine are required to read the entire field of the tag and for this purpose the switch 202 is preferably first raised to its upper setting, permitting read-out of the right hand section 218 (Fig. 2) of the tag during the first cycle. Thereafter, the switch 186 is thrown to its alternate setting to connect the various control tubes 195, through the trunk 185*a* to the common lines, like line 185, of the remaining switch contacts (not shown) in the tag reader, similar to contacts 85.

*Operation*

Assuming the right hand section 218 of the tag 33 (Fig. 2) to have coded therein the value 1250 and all other columns thereof to have the value 0 therein, positioning of the tag carriage and sensing pin unit thereon in tag sensing position, will set the various contact switches as indicated in Fig. 22. When a read-out machine cycle is initiated, the switch 209 will be closed and a circuit will be completed from the plus 375 volt supply to the anodes of the various tubes 214. Since the bridging brush 188 normally bridges the "0" contact 219 and the conductor strip 189 when the read-out machine is in its illustrated home position, a plus 50 volts will be applied through the conductor strip 189, brush 188, the zero contact 219, zero line 220 and all closed zero contact blades 82 to fire those tubes 214 associated with all orders of the machine except the tens, hundreds and thousands denominational orders, thereby blocking the associated stop slides 185 and consequently the racks 93 from advancing out of their zero positions.

As the scan switch moves to its No. 1 position, a circuit is completed to the No. 1 common line 207 to fire the tube 214 associated with the thousands order of the machine, thereby arresting the associated stop slide 155 and rack 93 in their No. 1 positions. The remaining stop slides and associated racks will thereafter be arrested in the same manner to register and print the value 1250.

Although I have described my invention in detail in its preferred embodiment and have therefore used specific terms and languages herein, it is to be understood that the present disclosure is illustrative rather than restrictive and that certain changes and modifications may be made without department from the spirit or scope of the claims appended hereto.

Having thus described the invention, what I desire to secure by United States Letters Patent is:

1. Apparatus for sensing a record having perforations therein arranged to represent indicia comprising the combination of a pair of slides arranged in side-by-side relation and having permutation formations thereon, means for moving said slides endwise in opposite directions, spaced perforation sensing devices effective upon sensing said perforations to differentially limit the extents of movement of said slides, and indicia representing elements located along said slides, each of said devices indicating a different index upon engagement with aligned formations on both of said slides.

2. Apparatus for sensing a record having perforations therein arranged to represent indicia comprising the combination of a pair of slides arranged in side-by-side relation and having permutation notches therein, means for moving said slides endwise in opposite directions, spaced perforation sensing devices effective upon sensing said perforations to differentially limit the extents of movement of said slides, and indicia representing elements located along said slides and adapted to enter aligned notches only in both of said slides.

3. Apparatus for sensing a record having perforations therein arranged to form a combinational unit code representing indicia comprising the combination of a pair of slides having permutation notches therein arranged to convert said combinational unit code into a single unit code, means for moving said slides endwise in opposite directions, a row of spaced perforation sensing devices, said row extending lengthwise of said slides and effective upon sensing said perforations to differentially limit the extents of movement of said slides, and indicia representing elements located along said slides, each of said elements indicating a different index upon entry into aligned notches only in both of said slides.

4. Apparatus for sensing a record having perforations therein arranged to form a combinational code representing indicia comprising the combination of a pair of slides having permutation formations thereon arranged to convert said combinational unit code into a single unit code, means for yieldably moving said slides endwise in opposite directions, a row of spaced perforation sensing devices, said row extending lengthwise of said slides and effective upon sensing said perforations to differentially limit the extents of movement of said slides, a plurality of circuits, and a plurality of circuit control devices located along said slides, each of said control devices being effective to control a respective one of said circuits upon entry into aligned notches in both of said slides.

5. Apparatus for sensing a record having perforations therein arranged to form a combinational code representing indicia comprising the combination of a pair of slides arranged in side-by-side relation and having permutation notches therein for converting a combinational unit code into a single unit code, means for yieldably moving said slides endwise in opposite directions, a row of spaced perforation sensing elements, said row extending lengthwise of said slides, means for yieldably urging said sensing elements against the surface of said perforated record, transfer elements settable into blocking positions by respective ones of said sensing elements upon entering said perforations, said transfer elements being effective when in said blocking positions to differentially limit the extents of movement of said slides, and electric circuit control devices spaced along said slides and adapted to enter aligned ones of said notches in both of said slides.

6. Apparatus for sensing a record having perforations therein arranged to form a combinational unit code representing indicia comprising the combination of a pair of slides arranged in side-by-side relation, yieldable means for moving said slides endwise in opposite directions, a row of spaced perforation sensing devices, said row extending lengthwise of said slides, said sensing devices being effective upon sensing said perforations to differentially limit the extent of movement of said slides, a plurality of circuits, and circuit control devices effective to control said circuits in accordance with the relative differential setting of said slides.

7. Apparatus for sensing a record having perforations therein arranged to form a combinational unit code representing indicia comprising the combination of a pair of slides arranged in side-by-side relation, yieldable means for moving said slides endwise in opposite directions, a row of spaced perforation sensing devices, said row extending lengthwise of said slides and effective upon sensing said perforations to differentially limit the extents of movement of said slides, a plurality of circuit control devices, and means responsive to different relative differential settings of said slides to actuate different ones of said circuit control devices, respectively.

8. Apparatus for sensing a record having perforations therein arranged to form a combinational code representing indicia comprising the combination of a pair of slides arranged in side-by-side relation, means for yieldably moving said slides endwise in opposite directions, a row of spaced perforation sensing elements, said row extending lengthwise of said slides, means for yieldably urging said sensing elements against the surface of said perforated record, transfer elements settable into slide blocking positions by respective ones of said sensing elements upon entering said perforations, said transfer elements being effective when in said blocking positions to differentially limit the extents of movement of said slides, a plurality of circuit closing devices, and means responsive to different relative differential settings of said slides to actuate different ones of said circuit control devices, respectively 9. Apparatus for sensing a record having perforations therein arranged to form a combinational unit code representing indicia comprising the combination of a pair of slides arranged in side-by-side relation, means for yieldably moving said slides in opposite endwise directions, a row of spaced transfer elements settable in blocking positions, said transfer elements being effective when in said blocking positions to differentially limit the extents of movement of said slides, a row of perforation sensing elements aligned with respective ones of said transfer elements, means for positioning said perforated record intermediate said transfer elements and said sensing elements, means for yieldably moving said sensing elements toward said record whereby those of said sensing elements which enter said perforations are effective to move respective ones of said transfer elements into blocking positions, a plurality of circuit controlling devices, and means responsive to different relative differential settings of said slides for actuating different ones of said circuit control devices, respectively.

10. Apparatus for sensing a record having perforations therein arranged to form a combinational unit code representing indicia comprising the combination of a pair of slides arranged in side-by-side relation, means for yieldably moving said slides in opposite endwise directions, a row of spaced transfer elements settable in blocking positions, said transfer elements being effective when in said blocking positions to differentially limit the extents of movement of said slides, a row of perforation sensing elements, a carriage for said sensing elements, means on said carriage for supporting said perforated record, means for guiding said carriage from a position wherein said sensing elements are out of alignment with said transfer elements to a position wherein said sensing elements are in alignment with said transfer elements, means on said carriage for yieldably moving said sensing elements toward said record whereby those of said sensing elements which enter said perforations are effective to move respective ones of said transfer elements into blocking positions, a plurality of circuit controlling devices, and means responsive to different relative differential settings of said slides for actuating different ones of said circuit control devices, respectively.

11. Apparatus according to claim 10 comprising means for preventing movement of said last mentioned yieldable means when said sensing elements are out of alignment with said transfer elements.

No references cited.